United States Patent Office 2,996,653
Patented Aug. 15, 1961

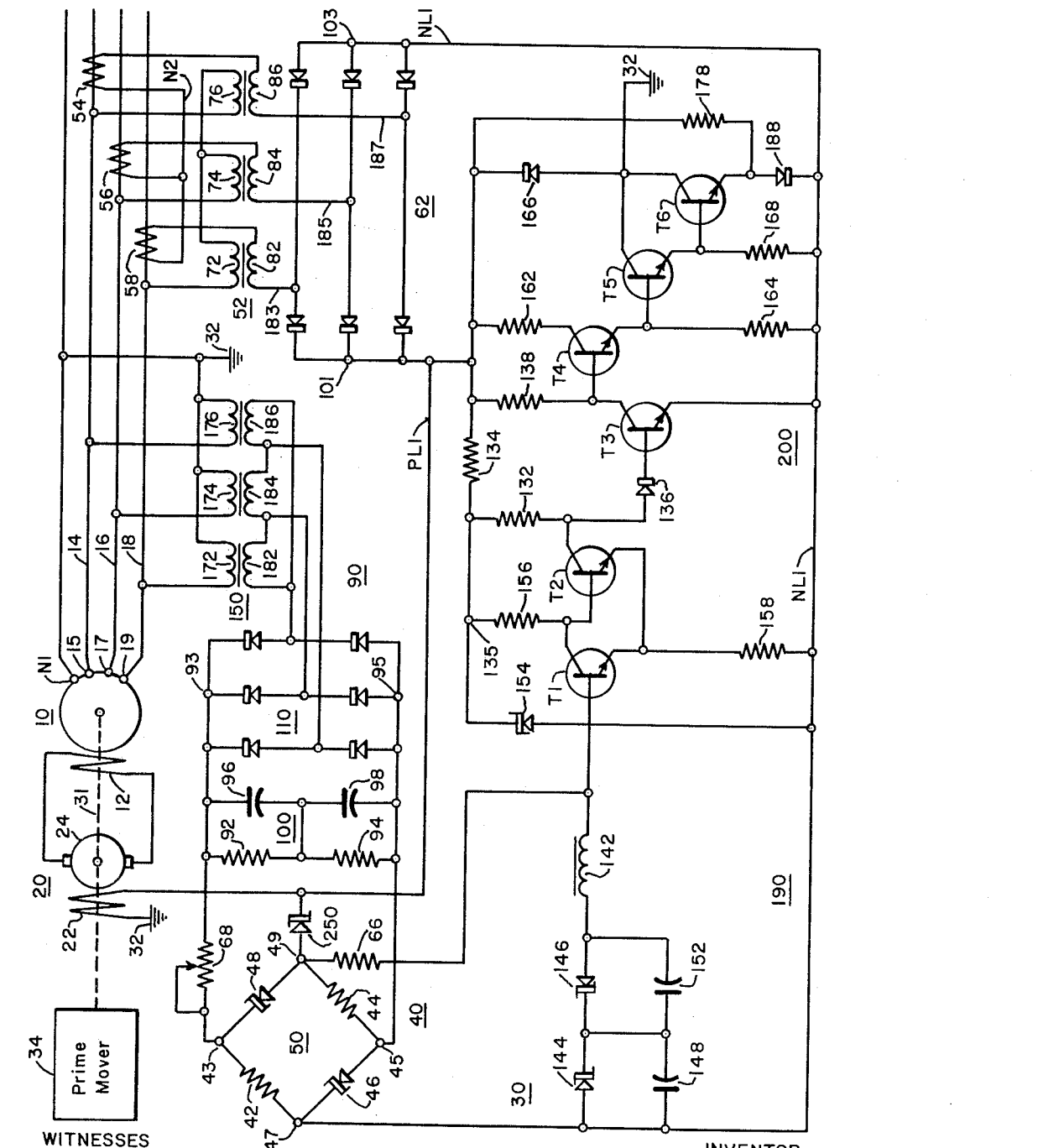

2,996,653
ELECTRICAL CONTROL APPARATUS
James L. Roof, Lima, Ohio, assignor to Westinghouse Electric Corporation, East Pittsburgh, Pa., a corporation of Pennsylvania
Filed Jan. 18, 1960, Ser. No. 3,084
7 Claims. (Cl. 322—25)

This invention relates to excitation systems for dynamoelectric machines, such as synchronous generators, and more particularly to electrical control apparatus, such as regulator systems, for controlling said excitation systems.

Various types of electrical control apparatus, such as regulator systems, are commonly employed to control the excitation current supplied to the excitation field winding of a dynamoelectric machine, such as a synchronous generator or alternator. An improved electrical control apparatus of the above type is disclosed in my copending application Serial No. 3,041 filed January 18, 1960, which is assigned to the same assignee as the present application. In the latter control apparatus, the excitation current is supplied to a dynamoelectric machine, such as a synchronous generator, in the form of periodic output pulses whose width varies in accordance with a unidirectional control signal which controls the operation of one or more static switching devices, such as transistors, to produce said periodic output pulses. In certain applications of a synchronous generator having an excitation field winding, it may be necessary that the generator supply an output current of at least a predetermined value during certain abnormal operating conditions, such as short-circuit or fault conditions, in order to actuate associated protective equipment, such as circuit breakers, fuses or protective relays. A conventional method of supplying excitation current to the field winding of a generator during such short-circuit or fault conditions is to provide current transformers which are responsive to the output current of said generator. The improved electrical control apparatus mentioned above is arranged or adapted to supply excitation current to the field winding or the associated generator from associated current transformers during short-circuit or fault conditions even in the absence of a normal unidirectional control signal in order that the output current of said generator be sufficient to actuate associated protective equipment. It has been found, however, that the value of the output current produced in the associated generator by the improved electrical control apparatus mentioned above may tend to be greater than desirable during short-circuit, fault or high overload conditions, and that the value of the torque applied to the shaft of said generator by the associated prime mover during the latter operating conditions may also tend to be greater than desirable. It is, therefore, desirable to provide an improved electrical control apparatus of the type described which has all of the advantages of the control apparatus disclosed in my copending application previously mentioned and which has the additional advantage of limiting the output current of the asociated generator during certain operating conditions, as well as the corresponding value of torque applied to the shaft of said generator, to predetermined safe values, as well as certain other advantages.

It is an object of this invention to provide a new and improved electrical control apparatus, such as a regulator system, for controlling the excitation current supplied to a dynamoelectric machine.

Another object of this invention is to provide a new and improved regulator system for maintaining the output voltage of a synchronous generator at substantially a predetermined value until the output current of said generator increases to substantially a predetermined value during certain operating conditions and then for limiting said output current to substantially the latter predetermined value.

A further object of this invention is to provide a regulator system for controlling the excitation current supplied to an associated synchronous generator and for limiting the maximum excitation current supplied to said generator and the corresponding torque applied to the shaft of said generator during certain abnormal operating conditions.

Other objects of the invention will, in part, be obvious, and will, in part, appear hereinafter.

For a fuller understanding of the nature and objects of the invention, reference should be had to the following detailed description taken in connection with the accompanying drawing, in which the single figure is a schematic diagram of circuits and apparatus showing an illustrative embodiment of the invention.

Referring now to the drawing, there is illustrated a dynamoelectric machine, more specifically a synchronous generator or alternator 10 having an excitation field winding 12 and the output terminals 15, 17 and 19, as well as a neutral terminal N1, since the stator windings (not shown) of the generator 10 are normally connected in a Y arrangement. In this instance, the generator 10 is disposed to supply electric power through the output terminals 15, 17 and 19 to a load (not shown) connected to the line conductors 14, 16 and 18, respectively, which are part of a three-phase electrical system. In order to obtain an excitation voltage across the field winding 12 of a relatively large magnitude, an exciter 20 is provided. The exciter 20 comprises an armature 24 which supplies excitation current to the field winding 12 of the generator 10 and a separate excitation field winding 22 having one end connected to a common ground connection, as indicated at 32. The armature or rotor member 24 of the exciter 20 is preferably mounted or disposed on the same shaft as the field winding 12 of the generator 10, as indicated at 31. The generator 10 and the exciter 20 are both driven by a suitable prime mover 34 which drives or applies a torque to the shaft 31. The latter torque varies with the output current of the generator 10 and is also related to the excitation current being supplied to the field winding 12 of the generator 10. The excitation current supplied to the excitation field winding 22 of the exciter 20 is provided by a first transformer means 52 which is responsive to the output voltage of the generator 10 and a second transformer means, comprising the current transformers 54, 56 and 58, which is responsive to the output current of the generator 10. In order to maintain the output voltage of the synchronous generator 10 at substantially a predetermined regulated value, a regulator system 30 is connected between said transformer means and the excitation field winding 22 of the exciter 20. In order to prevent said transformer means, as controlled by the regulator system 30, from supplying excessive excitation to the generator 10 during short-circuit conditions and during other abnormal operating conditions, a limiting means, more specifically the semiconductor diode 250, is connected in circuit relation with said transformer means and the regulator system 30.

Similarly to the electrical control apparatus disclosed in my copending application previously mentioned, the regulator system or loop 30 includes a first circuit or rectifying means 90 for obtaining a unidirectional output voltage which includes a ripple component and which varies with the alternating current output voltage of the generator 10, second circuit or voltage shaping means 100 for modifying or converting the ripple component of the unidirectional output voltage of the first means 90 to be substantially triangular in shape, a third circuit means or error detecting circuit 40 for comparing the unidirectional output voltage from the first circuit means 90, as modified by the second circuit means 100, with substantially a predetermined voltage or reference voltage to obtain an error signal or difference voltage which is substantially triangular in shape during normal operating conditions of the generator 10. The regulator system 30 also includes a switching means or device, more specifically the switching transistor T1, which is responsive to the error signal or difference voltage from the third circuit means 40 during normal operating conditions to produce periodic output pulses whose width varies with the output voltage of the generator 10 and a pulse amplifying circuit 200 for amplifying the periodic output pulses from the switching transistor T1 before the pulses are applied to the field winding 22 of the exciter 20. In general, the regulator system 30 operates during normal operating conditions to provide excitation current to the field winding 12 of the generator 10 through the exciter 20 in the form of periodic output pulses whose width is varied in accordance with the output voltage of said generator in order to maintain the output voltage of the generator 10 at substantially a predetermined regulated value.

Energy for the regulator system 30 and the excitation current for the generator 10 are obtained from the line conductors 14, 16 and 18 which, in turn, are connected to the output terminals 15, 17 and 19, respectively, of the generator 10. In particular, the three-phase potential transformer 52 which is responsive to the output voltage of the generator 10 and the current transformers 54, 56 and 58, which are responsive to the output current of said generator, are so interconnected as to produce a combined three-phase output voltage at the conductors 183, 185 and 187, respectively. In this instance, the transformer 52 includes the primary phase windings 72, 74 and 76 which are connected in a Y arrangement to the line conductors 18, 16 and 14, respectively. The current transformers 54, 56 and 58 are disposed adjacent to and in inductive relation with the line conductors 14, 16 and 18, respectively, and the output voltage from said current transformers varies with or is responsive to the output current of the generator 10 which flows in the respective line conductors. The transformer 52 also includes three secondary phase windings 82, 84 and 86, one end of each of said secondary phase windings being connected to the neutral terminal N2 through one of the associated current transformers 58, 56 and 54, respectively. The other ends of the secondary phase windings 82, 84 and 86 are connected to the combined three-phase output conductors 183, 185 and 187, respectively. The three-phase output voltage at the conductors 183, 185 and 187 is applied to the input terminals of the three-phase full wave rectifier 62 to which said conductors are connected. The unidirectional or direct-current output voltage of the full wave rectifier 62 appears at the output terminals 101 and 103 of the full wave rectifier 62. The negative terminal 103 of the full wave rectifier 62 is connected to the conductor NL1 and the positive terminal 101 of the full wave rectifier 62 is connected to the conductor PL1. In order to provide a substantially constant direct-current voltage for reasons which will be discussed hereinafter, the resistor 134 and the semiconductor diode 154 are connected in series circuit relationship, the series circuit being connected between the conductors NL1 and PL1 across the output of the full wave rectifier 62. The semiconductor diode 154 is preferably of the type known to the art as a Zener diode. Since the voltage across the diode 154 is normally in excess of the breakdown voltage of the diode 154, the voltage at the common terminal 135 between said diode and the resistor 134 will be a substantially constant, direct-current voltage which is positive with respect to the voltage at the conducor NL1. The voltage dropping resistor 134 also serves to limit the current which flows through the diode 154 after the diode 154 breaks down. It is to be noted that the positive terminal 101 of the full wave rectifier 62 is connected directly to one side of the field winding 22 of the exciter 20 by the conductor PL1.

The manner in which the potential transformer 52 and the current transformers 54, 56 and 58 are interconnected in circuit relation with the regulator system 30 and the output terminals of the generator 10 has several important results. For example, even if the line conductors 14, 16 and 18 or the load circuit connected thereto should become shorted or if a fault condition should occur thereon, thereby reducing the output voltage of the transformer 52 to a low or negligible value, the current transformers 54, 56 and 58 will continue to supply voltage to the regulator system 30 thereby providing field excitation for the generator 10 even when the line conductors 14, 16 and 18 are shorted. In other words, sufficient excitation is assured for the generator 10 even during short-circuit or fault conditions so that the output current of the generator 10 will be sufficient to actuate associated protective equipment.

In order to obtain a unidirectional output voltage or signal whose magnitude varies with the output voltage of the generator 10, the first circuit or rectifying means 90 is connected in circuit relation with the output terminals 15, 17 and 19 of said generator through the line conductors 14, 16 and 18, respectively. As illustrated, the first circuit means 90 includes the potential transformer 150 having three primary phase windings 172, 174 and 176 which are connected in a Y arrangement to the output terminals 19, 17 and 15, respectively, of the generator 10 through the line conductors 18, 16 and 14, respectively, with the neutral connection of said Y arrangement being connected to the neutral terminal N1 of the generator 10 and also to the common ground connection, as indicated at 32. The transformer 150 also includes the three secondary phase windings 182, 184 and 186 which in this instance are connected in a delta arrangement. The three-phase alternating current output voltage of the transformer 150, which varies with the alternating current output voltage of the generator 10, is applied to the input terminals of a three-phase full wave rectifier 110, the delta-connected secondary phase windings 182, 184 and 186 of the transformer 150 being connected to said input terminals. The unidirectional output voltage of the full wave rectifier 110 and of the first circuit means 90 appears at the output terminals 93 and 95 of the full wave rectifier 110 and includes a ripple component and a direct-current component as more fully explained in the copending application previously mentioned.

The second circuit or voltage shaping means 100 is provided in order to modify or convert the ripple component of the unidirectional output voltage from the first circuit means 90 to be substantially triangular in shape or configuration. In particular, the second circuit means 100 includes the first and second capacitors 96 and 98, respectively, which are connected in series circuit relation with one another, the series circuit being connected across or in parallel with the output terminals 93 and 95 of the first circuit means 90. In order to insure that the unidirectional output voltage from the first circuit means 90 at the terminals 93 and 95 is distributed or divided in substantially a predetermined ratio across the first and second capacitors 96 and 98, respectively, the resistors 92 and 94 are connected in parallel circuit relation with the capacitors 96 and 98, respectively, the resistors 92 and 94 also being connected in series circuit relationship with one another across the output terminals 93 and 95 of the first circuit means 90. In the operation of the regulator system 30, the second circuit means 100 modifies or converts the ripple component of the unidirectional output voltage of the first circuit means 90 to be substantially triangular in shape as previously mentioned.

In general, the third circuit means or error detecting circuit 40 is connected in circuit relation with the first and second circuit means 90 and 100, respectively, in order to compare the unidirectional output voltage of the first circuit means 90, as modified by the operation of the second circuit means 100, with substantially a predetermined voltage or with a reference voltage in order to obtain a difference output voltage or error signal which is substantially triangular in shape. The output difference voltage or error signal from the third circuit means 40 also includes a direct-current component which is relatively small in magnitude as determined by the difference between the reference voltage or level of the third circuit means 40 and the direct-current component of the unidirectional output voltage from the first circuit means 90, as modified by the operation of the second circuit means 100.

In this instance, the third circuit means or error detecting circuit 40 comprises a well-known bridge circuit 50 and a rheostat 68. The input terminals 43 and 45 of the bridge circuit 50 are connected through the rheostat 68 across the output terminals 93 and 95 of the first circuit means 90 and also across the second circuit means 100, as previously described. The bridge circuit 50 includes two parallel branches, the first branch comprising the resistor 42 connected in series circuit relationship with the semiconductor diode 46 and the second branch comprising the semiconductor diode 48 and the resistor 44 connected in series circuit relationship. The semiconductor diodes 46 and 48 are preferably of the type known to the art as Zener diodes. The output difference voltage or error signal of the third circuit means or error detecting circuit 40 appears at the output terminals 47 and 49 of the bridge circuit 50.

In the operation of the third circuit means or error detecting circuit 40, the unidirectional output voltage of the first circuit means 90 as modified by the second circuit means 100, is a measure of the output terminal voltage of the generator 10. The rheostat 68 is provided in order to vary the portion of the unidirectional output voltage of the first circuit means 90, as modified by the operation of the second circuit means 100, that is applied to the input terminals of the bridge circuit 50. During normal operation, the unidirectional voltage across each of the semiconductor diodes 46 and 48 remains substantially constant since the voltage applied to each of the semiconductor diodes 46 and 48 is always of a greater magnitude than the breakdown voltage of the diodes 46 and 48. It will therefore be seen that when a unidirectional voltage is applied at the input terminals of the bridge circuit 50 which is equal to twice the voltage drop across each of the semiconductor diodes 46 and 48, there will be substantially no voltage difference existing across the output terminals 47 and 49 of the third circuit means 40. When, however, the voltage across the input terminals 43 and 45 of the bridge circuit 50 is either above or below the reference voltage of the bridge circuit 50, which is twice the voltage drop across each of the semiconductor diodes 46 and 48, then a voltage difference will exist across the output terminals 47 and 49 of the third circuit means 40. The polarity of the output difference voltage or error signal from the third circuit means 40 at the terminals 47 and 49 will depend upon whether the input voltage is above or below the reference voltage of the bridge circuit 50. In the normal range of operation of the regulator system 30 as illustrated, only one polarity of output voltage from the third circuit means 40 is normally applied to the switching transistor T1. During normal operating conditions, the polarity of the output difference voltage or error signal from the third circuit means 40 which is substantially triangular in configuration is normally slightly positive at the terminal 49 with respect to the voltage at the output terminal 47 of the third circuit means 40. The rheostat 68 may be adjusted initially to obtain the desired magnitude and polarity of the output difference voltage from the third circuit means 40 and the setting of the rheostat 68 may also be changed to adjust the regulated value of voltage at which the regulator system 30 maintains the output terminal voltage of the generator 10. In effect, the third circuit means 40 operates to subtract substantially a predetermined voltage or a reference voltage from the unidirectional output voltage of the first circuit means 90, as modified by the second circuit means 100, to obtain substantially a triangular output difference voltage or error signal from the third circuit means 40 which additionally includes a direct-current component which varies with the output voltage of the generator 10 as reflected by the unidirectional output voltage of the first circuit means 90 as previously discussed. It has been found that the magnitude or amplitude of the substantially triangular component of the output voltage from the first circuit means 90, as modified by the operation of the second circuit means 100, which is found at the output of the third circuit means 40 varies only to a slight or negligible degree during the normal voltage operating range of the generator 10 while the direct-current component of the output difference voltage or error signal at the output terminals 47 and 49 of the third circuit means 40 varies to a much greater degree with changes in the magnitude of the output terminal voltage of the generator 10 at the output terminals 15, 17 and 19.

In general, the switching means, more specifically the switching transistor T1 having a base, an emitter and a collector and which is of the n-p-n junction type is connected to be responsive to the output difference voltage or error signal from the third circuit means 40 at the terminals 47 and 49 during normal operating conditions of the regulator system 30. In particular, the emitter of the switching transistor T1 is connected to the conductor NL1 through the resistor 158 while the collector of the transistor T1 is connected to the common terminal 135 between the diode 154 and the resistor 134 through the resistor 156, the voltage at the latter terminal being positive with respect to the voltage at the conductor NL1 and substantially constant as previously explained. In order to apply the output difference voltage or error signal from the third circuit means 40 which is substantially triangular in shape during normal operating conditions between the base and emitter of the transistor T1, the output terminal 49 of the third circuit means 40 is connected to the base of the transistor T1 through the current limiting resistor 66 while the output terminal 47 of the third circuit means 40 is connected to the emitter of the transistor T1 through the conductor NL1 and the resistor 158.

In order to provide a suitable time delay or series compensation network in the regulator system 30, the inductance 142 and the capacitors 148 and 152 are connected in series circuit relation with one another, the series circuit being connected between the output terminal 47 of the third circuit means 40 and the base of the transistor T1. The semiconductor diodes 144 and 146 are connected in parallel circuit relation with the capacitors 148 and 152 respectively, and in series circuit relation with one another and with the inductance 142, in order to protect the capacitors 148 and 152 when said capacitors are subjected to applied voltages or potentials having greater than a predetermined value or to prevent the application of voltages to said capacitors of a predetermined polarity. The diodes 144 and 146 are preferably of the type known to the art as Zener diodes and are connected in back-to-back relation or reversely poled with respect to one another. The capacitors 148 and 152 and the inductance 142 cooperate with the current limiting resistor 66 and the effective resistance of the components in the third circuit means 40 and the transformer 150 to form a series compensation network which stabilizes the operation of the regulator system 30, which of course is a closed loop system.

The transistor T1 operates in a switching mode such that when a voltage slightly in excess of the threshold voltage of the transistor T1 is applied between the base and the emitter of the transistor T1, the transistor T1 is effectively turned "on" and saturation current flows from the collector to the emitter of the transistor T1. The voltage necessary to cause saturation current to flow in the collector-emitter path of the transistor T1 is positive at the base with respect to the voltage at the emitter of the transistor T1. When the instantaneous output difference voltage or error signal from the third circuit means 40 is less than the threshold voltage of the transistor T1, the transistor T1 is substantially cut-off or non-conducting. The latter condition of the transistor T1 also prevails in the absence of an output difference voltage or error signal from the third circuit means 40. Saturation current will flow from the collector to the emitter of the transistor 51 when the instantaneous output difference voltage or error signal from the third circuit means 40 slightly exceeds the threshold voltage required between the base and emitter of the transistor T1.

The switching transistor T1 cooperates with the first, second and third circuit means 90, 100 and 40, respectively, to form a pulse width modulator 190. As explained in greater detail in the copending application previously mentioned, the output of the pulse width modulator 190 will be in the form of periodic output pulses, the width of which will vary in accordance with the output difference voltage or error signal from the error detecting circuit or third circuit means 40. The width of the pulses will be greater or less depending upon whether the output voltage of the generator 10 during normal operating conditions is above or below the regulated value of the output voltage of the generator 10. Periodic pulses of current will flow from the common terminal 135 between the diode 154 and the resistor 134 through the resistor 156 into the collector and out of the emitter of the transistor T1 and through the resistor 158 to the conductor NL1. The pulses of current which flow from the collector to the emitter of the transistor T1 will have substantially a constant magnitude but a varying time width which depends upon the magnitude of the direct-current component of the substantially triangular output difference voltage or error signal from the third circuit means 40.

In general, the pulse amplifying circuit 200 is connected in circuit relation between the switching transistor T1 and the field winding 22 of the exciter 20 for amplifying the periodic output pulses provided by the pulse width modulator 190 which includes the first, second and third circuit means 90, 100 and 40, respectively, and the switching transistor T1. The pulse amplifying circuit 200 comprises a plurality of switching devices, more specifically the switching transistors T2, T3, T4, T5 and T6, each having a base, an emitter and a collector. As illustrated, the transistors T2 through T5 are connected to amplify the periodic output pulses from the pulse width modulator just described before the pulses are applied to the transistor T6 which is connected as a control or switching element in series circuit relation with the field winding 22 of the exciter 20, the series circuit being connected through the diode 188 across the unidirectional current output voltage of the full wave rectifier 62. The transistors T2, T4, T5 and T6 are arranged to be conducting in the absence of periodic output pulses from the switching transistor T1 while the switching transistor T3 is arranged to be substantially non-conducting or cut-off in the absence of periodic output pulses from the switching transistor T1. The transistors T2 through T6, similarly to the switching transistor T1, are illustrated as being of the n-p-n junction type and are all operated in a switching mode so that each of said transistors is either conducting saturation current or is substantially non-conducting or cut-off.

The periodic output pulses from the pulse width modulator 190 at the collector of the transistor T1 are applied to the transistor T2 to cause a change in the voltage between the base and the emitter of the transistor T2. The emitter of the transistor T2 is connected to the conductor NL1 through the resistor 153 similarly to the transistor T1 while the base of the transistor T2 is connected to the common terminal between the collector of the transistor T1 and the resistor 156 which serves as a load resistor for the transistor T1. The resistor 158 also serves to sharpen the switching response or triggering of the transistors T1 and T2. The collector of the transistor T2 is connected through the resistor 132 to the common terminal 135 between the diode 154 and resistor 134, the voltage at the latter terminal being positive with respect to the voltage of the conductor NL1 and subsantially constant. The resistor 132 also serves as a load resistor for the transistor T2 which is normally conducting saturation current in the absence of an output pulse from the first transistor T1, which would appear across the load resistor 156, since the voltage then applied between the base and the emitter of the transistor T2 would be in excess of the threshold voltage required to cause saturation current to flow in the transistor T2. When an output pulse appears at the collector of the transistor T1 and across the load resistor 156, the voltage between the base and the emitter of the transistor T2 decreases below the threshold voltage of the transistor T2 and the transistor T2 then becomes substantially non-conducting or cut-off for the duration of such a pulse.

The output of the transistor T2 which appears at its collector and across the load resistor 132 is applied to the switching transistor T3 through the diode 136 whenever an output pulse appears at the collector of the transistor T1. In particular, the emitter of the switching transistor T3 is directly connected to the conductor NL1 while the base of the transistor T3 is connected to the common terminal between the collector of the transistor T2 and the load resistor 132 through the diode 136 which serves to effectively increase the threshold voltage of the transistor T3 by substantially a predetermined value. The collector of the transistor T3 is connected to the conductor PL1 through the load resistor 138. As previously mentioned, the transistor T3 is normally arranged to be substantially non-conducting or cut-off in the absence of a periodic output pulse at the output of the transistor T1. Whenever an output pulse appears at the output of the transistor T1 across the load resistor 156, the switching transistor T2 then becomes substantially non-conducting or cut-off and the voltage across the load resistor 132 associated with the transistor T2 decreases to cause a corresponding change in the voltage between the base and the emitter of the transistor T3. The latter change in the voltage between the base and the emitter of the transistor T3 is in a direction as to increase the voltage therebetween to a value of the proper polarity above the threshold voltage of the transistor T3, as modified by the diode 136, and the transistor T3 will conduct saturation current in the collector-emitter circuit of the transistor T3 for the duration of the applied pulse from the transistor T2. The output pulse which appears at the collector of the transistor T3 across its associated load resistor 138 is then applied to the switching transistors T4, T5 and T6 which, in general, are connected as directly coupled amplifiers to additionally amplify the periodic output pulses at the output of the transistor T1.

In particular, the base of the transistor T4 is connected to the common terminal between the collector of the transistor T3 and the load resistor 138 while the emitter of the transistor T4 is connected to the conductor NL1 through the resistor 164. The collector of the transistor T4 is connected to the conductor PL1 through the load resistor 162. The emitter of the transistor T4 is directly connected to the base of the transistor T5 so that the output current of the transistor T4 becomes the input current or signal of the transistor T5. Similarly, the emitter of the transistor T5 is directly connected to the base of the transistor T6 so that the output current or signal of the transistor T5 becomes the input current or signal for the transistor T6. The emitters of the transistors T5 and T6 are connected to the conductor NL1 through the resistor 168 and the diode 188 which purpose will be explained hereinafter. The collectors of the transistors T5 and T6 are connected to each other and to the common ground connection, as indicated at 32, which is also connected to one end of the field winding 22 of the exciter 20. The resistors 164 and 168 are preferably of the type having a negative temperature coefficient in order to compensate for the changes in the threshold voltages of the transistors T5 and T6, respectively, with changes in environmental temperature. The resistor 178 is connected between the conductor PL1 and the common terminal between the emitter of the transistor T6 and the diode 188 to cooperate with the diode 188 in reducing leakage currents in the collector-emitter circuits of the transistors T5 and T6 whenever the latter transistors are substantially non-conducting or cut-off. The diode 166 which may be any type of well known non-linear device which has a low forward resistance and a high backward or reverse resistance, is connected in parallel circuit relation with the field winding 22 of the exciter 20 between the common ground connection 32 and the conductor PL1 to provide a low resistance path for the voltage produced by the collapsing field of the field winding 22 during periods in which the transistor T6 is non-conducting. The diode 166 prevents any excessive voltage across the transistors T2 through T6 due to the voltage produced by the collapsing field of the field winding 22 of the exciter 20.

The transistors T4, T5 and T6 are arranged to conduct saturation current in the absence of periodic output pulses at the output of the transistor T1. When an output pulse appears at the output of the transistor T1 and the transistor T3 begins to conduct saturation current, the voltage across the load resistor 138 increases to thereby decrease the voltage between the base and the emitter of the transistor T4 to a value below the threshold voltage of the transistor T4 which then becomes substantially non-conducting or cut-off. Since the transistors T5 and T6 are directly coupled to the output of the transistor T4, the transistors T5 and T6 similarly become non-conducting or cut-off to thereby decrease the excitation current applied to the field winding 22 of the exciter 20 to a negligible value.

In summary, during normal operating conditions of the regulator system 30, the operation of the pulse amplifying circuit 200 is to amplify the periodic output pulses from the pulse width modulator 190 at the output of the transistor T1 and to control the conductivity or "on"-"off" time of the transistor T6 in accordance with the width of the amplified pulses in order to vary the average excitation current applied to the excitation field winding 22 of the exciter 20. The width of the periodic output pulses from the pulse width modulator 190 determines the portion of time during which the transistor T6 is either conducting or non-conducting. The portion of time during which the transistor T6 is conducting compared to the portion of time during which the transistor T6 is substantially non-conducting or cut-off determines the average value of the excitation current applied to the excitation field winding 22 of the exciter 20. The average value of the current applied to the excitation field winding 22 of the exciter 20 determines the output voltage across the armature 24 of the exciter 20. The output voltage across the armature 24 of the exciter 20 determines the excitation current applied to the excitation field winding 12 of generator 10. The output terminal voltage of the generator 10 is controlled, in turn, by the excitation current applied to the excitation field winding 12 of the generator 10.

As previously explained, the excitation current applied to the field winding 22 of the exciter 20 through the collector-emitter path of the transistor T6 is supplied from the output of the full wave rectifier 62 whose input is supplied from the output terminals of the generator 10 through the transformer 52 and the current transformers 54, 56 and 58. It is important to note that the full wave rectifier 62 supplies excitation current to the field winding 22 of the exciter 20 in the absence of periodic output pulses from the transistor T1 whose operation, in turn, depends upon the necessary output difference voltage or error signal from the third circuit means 40 which, in turn, depends upon the output terminal voltage of the generator 10. It will be seen, therefore, that the latter feature will be particularly advantageous during the starting up of the generator 10 since the regulator system 30 is arranged to supply excitation current to the field winding 22 of the exciter 20 even though the voltage of the generator 10 is not of the normal magnitude such as to cause a normal difference voltage or error signal to be applied to the transistor T1 and the pulse amplifying circuit 200 from the third circuit means 40. It is also important to note that the excitation current which is supplied from the line conductors 14, 16 and 18 through the full wave rectifier 62 to the field winding 22 flows from the positive terminal 101 of the full wave rectifier 62 through the conductor PL1 to the common ground connection 32 and then through the collector-emitter path of the transistor T6 which functions as a switching means or device as previously described and then through the diode 188 to the conductor NL1 and back to the negative terminal 103 of the full wave rectifier 62.

The normal operation of the regulator system 30, in the absence of a short circuit or fault condition at the output terminals of generator 10 will now be described. The rheostat 68 of the third circuit means 40 is adjusted initially so that an output difference voltage or error signal appears at the output terminals 47 and 49 of the third circuit means 40 which is slightly positive at the terminal 49 with respect to the voltage at the terminal 47 during normal operating conditions of the generator 10. The magnitude of the output difference voltage or error signal from the third circuit means 40 is also adjusted to be of the proper value as to cause periodic output pulses to appear at the output of the pulse width modulator 190, more specifically at the collector of the transistor T1 which, when amplified by the pulse amplifying circuit 200 and applied to the transistor T6 will cause a value of average excitation current to be applied to the excitation field winding 22 of the exciter 20, which will result in a desired value of regulated voltage at the output terminals 15, 17 and 19 of generator 10. After the rheostat 68 has been adjusted for the desired regulated value of voltage at the output terminals of the generator 10, a change in the output terminal voltage of the generator 10 will cause a corresponding change in the output voltage of the third circuit means 40 which appears at the terminals 47 and 49. For example, if the output terminal voltage of the generator 10 should start to drop below the desired regulated value, the direct-current component of the output difference voltage or error signal from the third circuit means 40 appearing at the terminals 47 and 49 will decrease as the output terminal voltage of the generator 10 decreases. The effect of a decrease in the direct-current component of the output difference voltage or error signal at the output terminals 47 and 49 of the third circuit means 40 is to decrease the width of the periodic output pulses from the pulse width modulator 190. The periodic output pulses of decreased width of the pulse width modulator 190 are then amplified by the pulse amplifying circuit 200 and applied to the transistor T6 with the effect that the portion of time during which the transistor T6 conducts increases and the average current applied to the field winding 22 of the exciter 20 increases. The output voltage of the exciter 20 across the armature 24 also increases and the excitation current applied to the excitation field winding 12 of generator 10 increases until the output terminal voltage of generator 10 increases to substantially its regulated value.

On the other hand, if the output terminal voltage of the generator 10 increases to a value above the desired regulated value, then the direct-current component of the output difference voltage or error signal from the third circuit means 40 also increases and the width of the periodic output pulses from the pulse width modulator 190 increases. When the width of the periodic output pulses from the pulse width modulator 190 increases, the output pulses applied to the transistor T6 of the pulse amplifying circuit 200 reduces the relative portion of time during which the transistor T6 is conducting and therefore reduces the average current applied to the field winding 22 of the exciter 20. The output voltage of the exciter 20 and the excitation current applied to the field winding 12 of the generator 10 also decreases until the output terminal voltage of the generator 10 is reduced to substantially its regulated value.

In general, the limiting means, more specifically the semiconductor diode 250, which is preferably of the type known to the art as a Zener diode, is connected in circuit relation with the regulator system 30 for limiting the excitation current supplied to the excitation field winding 12 of the generator 10 and the corresponding output current of the generator 10 when a short-circuit or fault condition occurs in the load circuit connected to the line conductors 14, 16 and 18. In particular, the semiconductor diode 250 is connected in series circuit relation with the current limiting resistor 66, the base-emitter circuit of the transistor T1 and the resistor 158, the series circuit being connected across the output terminals 101 and 103 of the full wave rectifier 62 through the conductors PL1 and NL1, respectively. The semiconductor diode 250 is connected to be reversely poled with respect to the unidirectional output voltage of the full wave rectifier 62 which is responsive to the output voltage of the generator 10 and also to the output current of the generator 10. The diode 250 is of a general type which has a predetermined, substantially constant, non-destructive reverse breakdown characteristic when the voltage applied to said diode in the reverse direction exceeds substantially a predetermined value. In other words, as long as the voltage across the output terminals 101 and 103 of the full wave rectifier 62 which varies with both the output voltage and the output current of the generator 10 remains below a predetermined value, the voltage across the diode 250 will remain below a critical breakdown voltage associated with said diode and the current through said diode will remain at substantially a negligible value. When, however, the voltage across the output terminals 101 and 103 of the full wave rectifier 62 and the corresponding voltage across the diode 250 exceeds certain predetermined values, the voltage across the diode 250 will exceed a critical breakdown value in its reverse volt-ampere characteristic and current will begin to flow through said diode and the base-emitter circuit of the transistor T1.

The operation of the limiting means, more specifically the semiconductor diode 250 and the effect of said operation on the operation of the regulator system 30 will now be considered. During the normal operation of the generator 10 and the regulator system 30 in the absence of a short circuit or fault condition at the line conductors 14, 16 and 18, the semiconductor diode 250 has no effect on the operation of the regulator system 30. This is because the diode 250 is poled in a reverse direction and it does not permit current flow from the full wave rectifier 62 to flow directly through the base-emitter or input circuit of the transistor T1 so long as the voltage across the diode 250 is below the critical breakdown voltage associated with said diode.

On the other hand, when a short-circuit or fault condition occurs at the line conductors 14, 16 and 18 and the output terminal voltage of the generator 10 tends to decrease, the polarity of the output voltage of the third circuit means 40 at the terminals 47 and 49 reverses and tends to be of a direct-current type rather than being triangular in configuration as in the normal operation of the regulator system 30. The effect of the latter operating condition of the third circuit means 40 in the absence of the semiconductor diode 250 would be to maintain the first transistor T1 in a substantially non-conducting condition with the transistor T6 in a substantially continuously conducting condition. The effect of the latter operating condition of the transistor T6 in the absence of the semiconductor diode 250 would be to apply excessive excitation current from the full wave rectifier 62 to the field winding 22 of the exciter 20 through the conductor PL1 and the collector-emitter path of the transistor T6 as previously described. The full wave rectifier 62 continues to supply excitation current to the field winding 22 of the exciter 20 since the current transformers 54, 56 and 58 are responsive to the output current of the generator 10 which tends to increase to excessive values when a short-circuit or fault condition occurs at the output terminals of said generator. Because of the saturating characteristics of the current transformers 54, 56 and 58, when a fault or short-circuit occurs at the line conductors 14, 16 and 18, the output voltage of the full wave rectifier 62 includes a ripple component comprising high potential spikes or peaks and having a frequency substantially six times the output frequency of the generator 10. The ripple component of the output voltage of the full wave rectifier 62 during the latter operating condition periodically causes the semiconductor diode 250 to break down and causes periodic input pulses to be applied to the base-emitter circuit of the transistor T1 similarly to the operation of the third circuit means 40 when the conduction state of the transistor T1 is being controlled by the third circuit means 40 during normal operating conditions. When an output pulse or spike appears at the output terminals 101 and 103 of the full wave rectifier 62 and causes the semiconductor diode 250 to break down for the duration of said output pulse, an input signal or current flows from the conductor PL1 at the output terminal 101 of the full wave rectifier 62 through the diode 250, the resistor 66, the base-emitter circuit of the transistor T1 and the resistor 158 to the conductor NL1 which is connected to the output terminal 103 of the full wave rectifier 62. The transistor T1 is turned "on" or conducts saturation current for the duration of the latter applied pulse and the transistor T6 at the output of the pulse amplifying circuit 200 becomes non-conducting for the duration of the latter pulse to thereby decrease the excitation current applied to the field winding 22 of the exciter 20 to a negligible value for the duration of said pulse. In other words, the transistor T1 is no longer responsive to the output of the third circuit means 40 and the output voltage of the generator 10 but, instead, becomes responsive to periodic input pulses from the full wave rectifier 62 and the current transformers 54, 56 and 58 which in turn are responsive to the output current of the generator 10.

In summary, the effect of the semiconductor diode on the operation of the regulator system 30 whenever a short-circuit or fault condition occurs at the output terminals 15, 17 and 19 of the generator 10 is to modify the operation of the regulator system 30 to be responsive to the output current of the generator 10 rather than to the output voltage of the generator 10. The regulator system 30 then limits or regulates the output current of the generator 10 to substantially a predetermined value and the output current of the generator 10 will continue at a value sufficient to actuate associated protective equipment. As previously mentioned, the transistor T1 then becomes responsive to the ripple component of the output voltage of the full wave rectifier 62 rather than to the output difference voltage or error signal from the third circuit means 40 and the balance of the regulator system 30 which includes the pulse amplifying circuit 200 continues to apply excitation current to the field winding 22 of the exciter 20 in the form of periodic output pulses because of the high potential spikes or peaks associated with said ripple component which, in turn, depends upon the saturating characteristics of the current transformer 54, 56 and 58. The semiconductor diode 250 therefore serves to limit the output fault current of the generator 10 to substantially a predetermined value which is much less than the output fault current of said generator in the absence of the semiconductor diode 250. It is also important to note that in addition to its limiting function the semiconductor diode serves to establish a reference voltage which converts the ripple component of the output voltage of the full wave rectifier 62 to periodic input pulses which are applied to the transistor T1 whenever a fault or short-circuit condition occurs in the load circuit connected to the line conductors 14, 16, and 18 which are connected at the respective output terminals of the generator 10.

It is to be understood that in certain applications that one or more forward connected semiconductor diodes, such as those of the silicon type, may be substituted for the reversely poled semiconductor diode 250 as shown in the drawing with the threshold voltage of said diodes serving to prevent current flow in the associated limiting circuit through the base-emitter circuit of the transistor T1 until the limiting signal applied to said diodes exceeds a predetermined value which exceeds the sum of the threshold voltages of the series connected diodes.

The apparatus embodying the teachings of this invention has several advantages. For example, the excitation current supplied by an excitation system and its associated regulator system as disclosed is not limited or affected during normal operating conditions in the absence of short-circuit or fault conditions at the line conductors 14, 16 and 18. During certain abnormal operating conditions, however, as described, the regulator system 30 including a limiting means as disclosed limits the excitation current supplied to the associated synchronous generator and the corresponding output fault current as well as the torque applied to the shaft of said generator by the associated prime mover to substantially predetermined values to thereby prevent damage to the windings of said generator and to the mechanical coupling between said generator and its associated prime mover.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In an electrical control apparatus for maintaining at substantially a predetermined value during normal operating conditions, the output voltage of an alternating current generator having an excitation field winding and output terminals, the combination comprising, first and second transformer means connected in circuit relation with said output terminals for providing an output current in response to the output voltage and current, respectively, of said generator, rectifying means connected in circuit relation between said transformer means and said field winding for supplying a unidirectional output current thereto as excitation current, a regulator system connected in circuit relation between said output terminals and said field winding to be normally responsive to the output voltage of said generator for controlling the excitation current supplied to said field winding by said rectifying means to maintain said output voltage at said predetermined value, said regulator system including a plurality of switching devices in the output portion thereof, and a semiconductor diode having a substantially constant voltage region in its reverse voltage-current characteristic for applied voltages above a breakdown voltage connected in circuit relation with said rectifying means and said switching devices, said diode being adapted to break down when a fault occurs at said output terminals in response to the output current of said rectifying means and to apply input pulses to said switching devices in response to said fault which limit the magnitude of the output fault current of said generator to substantially a predetermined value.

2. In an electrical control apparatus for maintaining at substantially a predetermined value during normal operating conditions, the output voltage of an alternating current generator having an excitation field winding and output terminals, the combination comprising, first and second transformer means connected in circuit relation with said output terminals for providing an output current in response to the output voltage and current, respectively, of said generator, rectifying means connected in circuit relation between said transformer means and said field winding for supplying a unidirectional output current thereto as excitation current, a regulator system connected in circuit relation between said output terminals and said field winding to be normally responsive to the output voltage of said generator for controlling the excitation current supplied to said field winding by said rectifying means to maintain said output voltage at said predetermined value, said regulator system including a plurality of switching devices in the output portion thereof, and a semiconductor device having a substantially constant voltage region in its reverse voltage-current characteristic for applied voltages above a breakdown voltage connected in circuit relation with said rectifying means and said switching devices, said device being adapted to break down when a fault occurs at said output terminals in response to the output current of said rectifying means and to apply input pulses to said switching devices in response to said fault which limit the magnitude of the output fault current of said generator to substantially a predetermined value.

3. In an electrical control apparatus for maintaining at substantially a predetermined value during normal operating conditions the output voltage of an alternating current generator having an excitation field winding and output terminals, the combination comprising, first and second transformer means connected in circuit relation with said output terminals for providing an output current in response to the output voltage and current, respectively, of said generator, rectifying means connected in circuit relation between said transformer means and said field winding for supplying a unidirectional output current thereto as excitation current, a regulator system connected in circuit relation between said output terminals and said field winding to be normally responsive to the output voltage of said generator for controlling the excitation current supplied to said field winding by said rectifying means to maintain said output voltage at said predetermined value, said regulator system including a plurality of switching transistors in the output portion thereof, and a semiconductor diode having a substantially constant voltage region in its reverse voltage-current characteristic for applied voltages above a breakdown voltage connected in circuit relation with said rectifying means and said switching transistors, said diode being adapted to break down when a fault occurs at said output terminals in response to the output current of said rectifying means and to apply input pulses to said switching transistors in response to said fault which limit the magnitude of the output fault current of said generator to substantially a predetermined value.

4. In a regulator system for a dynamoelectric machine having an excitation field winding and output terminals, the combination comprising first and second transformer means, connected in circuit relation with said output terminals for providing an output current in response to the output voltage and current, respectively, of said machine, rectifying means connected in circuit relation with said transformer means for providing a unidirectional output current, a pulse width modulating circuit connected in circuit relation with said output terminals for providing output pulses whose width varies with the output voltage of said machine, a plurality of switching devices connected in circuit relation with said modulating circuit and said rectifying means for providing amplified unidirectional output pulses whose width varies with the output voltage of said machine, said switching devices being connected in circuit relation with said field winding to apply said amplified output pulses thereto as excitation current to thereby maintain the output voltage of said machine at substantially a predetermined value during normal operating conditions, and a semiconductor diode having a substantially constant voltage region in its reverse voltage-current characteristic for applied voltages above a predetermined value connected in circuit relation between said rectifying means and said switching devices, said diode being adapted to break down when a fault occurs at said output terminal and apply input pulses to said switching devices and to limit the fault current to substantially a predetermined value.

5. In a regulator system for a dynamoelectric machine having an excitation field winding and output terminals, the combination comprising first and second transformer means, connected in circuit relation with said output terminals for providing an output current in response to the output voltage and current, respectively, of said machine, rectifying means connected in circuit relation with said transformer means for providing a unidirectional output current, a pulse width modulating circuit connected in circuit relation with said output terminals for providing output pulses whose width varies with the output voltage of said machine, a plurality of switching devices connected in circuit relation with said modulating circuit and said rectifying means for providing amplified unidirectional output pulses whose width varies with the output voltage of said machine, said switching devices being connected in circuit relation with said field winding to apply said amplified output pulses thereto as excitation current to thereby maintain the output voltage of said machine at substantially a predetermined value during normal operating conditions, and a semi-conductor device having a substantially constant voltage region in its reverse voltage-current characteristic for applied voltages above a predetermined value connected in circuit relation between said rectifying means and said switching devices, said device being adapted to break down when a fault occurs at said output terminal and apply input pulses to said switching devices and to limit the fault current to substantially a predetermined value.

6. In a regulator system for a dynamoelectric machine having an excitation field winding and output terminals, the combination comprising first and second transformer means, connected in circuit relation with said output terminals for providing an output current in response to the output voltage and current, respectively, of said machine, rectifying means connected in circuit relation with said transformer means for providing a unidirectional output current, a pulse width modulating circuit connected in circuit relation with said output terminals for providing output pulses whose width varies with the output voltage of said machine, a plurality of switching transistors connected in circuit relation with said modulating circuit and said rectifying means for providing amplified unidirectional output pulses whose width varies with the output voltage of said machine, said switching transistors being connected in circuit relation with said field winding to apply said amplified output pulses thereto as excitation current to thereby maintain the output voltage of said machine at substantially a predetermined value during normal operating conditions, and a semiconductor diode having a substantially constant voltage region in its reverse voltage-current characteristic for applied voltages above a predetermined value connected in circuit relation between said rectifying means and said switching transistors, said diode being adapted to break down when a fault occurs at said output terminal and apply input pulses to said switching transistors and to limit the fault current to substantially a predetermined value.

7. In an electrical control apparatus for maintaining at substantially a predetermined value during normal operating conditions, the output voltage of an alternating current generator having an excitation field winding and output terminals, the combination comprising, first and second transformer means connected in circuit relation with said output terminals for providing an output current in response to the output voltage and current, respectively, of said generator, rectifying means connected in circuit relation between said transformer means and said field winding for supplying a unidirectional output current thereto as excitation current, a regulator system connected in circuit relation between said output terminals and said field winding to be normally responsive to the output voltage of said machine for controlling the excitation current supplied to said field winding by said rectifying means to maintain said output voltage at said predetermined value, said regulator system including a plurality of switching devices in the output portion thereof, and a semiconductor diode having a predetermined threshold voltage associated therewith in its forward voltage-current characteristic which conducts current to a greater degree for applied voltages above substantially a predetermined value connected in circuit relation with said rectifying means and said switching devices, said diode being adapted to conduct when a fault occurs at said output terminals in response to the output current of said rectifying means and to apply input pulses to said switching devices in response to said fault which limit the magnitude of the output fault current of said generator to substantially a predetermined value.

No references cited.